United States Patent
Bresolin (10) Patent No.: US 10,912,285 B2
(45) Date of Patent: Feb. 9, 2021

(54) SUPPORT DEVICE FOR AQUARIUM ACCESSORIES

(71) Applicant: HYDOR SRL, Vicenza (IT)

(72) Inventor: Valerio Bresolin, Vicenza (IT)

(73) Assignee: HYDOR SRL, Vicenza (IT)

( * ) Notice: Subject to any disclaimer, the term of this patent is extended or adjusted under 35 U.S.C. 154(b) by 643 days.

(21) Appl. No.: 15/327,256

(22) PCT Filed: Jul. 6, 2015

(86) PCT No.: PCT/IT2015/000180
§ 371 (c)(1),
(2) Date: Jan. 18, 2017

(87) PCT Pub. No.: WO2016/013036
PCT Pub. Date: Jan. 28, 2016

(65) Prior Publication Data
US 2017/0150702 A1 Jun. 1, 2017

(30) Foreign Application Priority Data
Jul. 22, 2014 (IT) ............................... VE2014A0044

(51) Int. Cl.
*A01K 63/00* (2017.01)
*F16B 47/00* (2006.01)
(Continued)

(52) U.S. Cl.
CPC .......... *A01K 63/006* (2013.01); *A01K 63/003* (2013.01); *F16B 47/00* (2013.01); *F16M 13/022* (2013.01); *F16B 2001/0035* (2013.01)

(58) Field of Classification Search
CPC ..... E06B 7/32; A47L 1/09; A47L 1/12; A01K 63/10; A01K 63/006; A01K 63/04; A01K 63/042; A01K 63/045
(Continued)

(56) References Cited

U.S. PATENT DOCUMENTS 3,746,169 A * 7/1973 Willinger ............. A01K 63/045
210/167.26
6,102,768 A * 8/2000 Cho .......................... A63H 3/36
428/31
(Continued)

FOREIGN PATENT DOCUMENTS

CN 101479489 A 7/2009
CN 202759527 U 2/2013
(Continued)

OTHER PUBLICATIONS

International Search Report issued in corresponding application PCT/IT2015/000180, completed Oct. 30, 2015 and dated Nov. 10, 2015.
(Continued)

*Primary Examiner* — Ebony E Evans
(74) *Attorney, Agent, or Firm* — Merchant & Gould, P.C.

(57) ABSTRACT

In a support device for aquarium accessories including a first fixing element appliable on the inner surface of a wall of an aquarium and a sustaining element for an accessory supportable by the first fixing element, the first fixing element has a concave cap and the sustaining element has a convex cap housable at least partially inside the concave cap. Furthermore, the support device includes a cap-shaped first magnetic or ferromagnetic element, the first fixing element includes a second magnetic or ferromagnetic element, and the convex cap of the sustaining element is interposed between the concave cap of the first fixing element and the first magnetic or ferromagnetic element so that, due to magnetic attraction between the first magnetic or ferromagnetic element and the second magnetic or ferromagnetic element, the sustaining element is supported by the first fixing element and, at the same time, it is rotationally movable.

16 Claims, 6 Drawing Sheets

(51) Int. Cl.
*F16M 13/02* (2006.01)
*F16B 1/00* (2006.01)

(58) Field of Classification Search
USPC ........ 119/484, 264, 247, 259, 160, 261, 269
See application file for complete search history.

(56) References Cited

U.S. PATENT DOCUMENTS

| | | | |
|---|---|---|---|
| 8,191,846 B2* | 6/2012 | Bresolin | A01K 63/10 |
| | | | 248/205.5 |
| 9,283,141 B2* | 3/2016 | Lawyer | A61H 33/6021 |
| 2005/0150042 A1* | 7/2005 | Bresolin | B05B 3/0422 |
| | | | 4/596 |
| 2009/0211533 A1 | 8/2009 | Sprung | |
| 2011/0056437 A1 | 3/2011 | Sprung | |
| 2012/0017840 A1* | 1/2012 | Allis | A01K 63/045 |
| | | | 119/261 |
| 2012/0204803 A1* | 8/2012 | Sprung | A47L 1/09 |
| | | | 119/264 |
| 2015/0027938 A1* | 1/2015 | Farrish | A01K 63/04 |
| | | | 210/167.22 |
| 2019/0200586 A1* | 7/2019 | Zhang | A01K 63/006 |
| 2019/0364854 A1* | 12/2019 | Woldman | A01K 63/006 |

FOREIGN PATENT DOCUMENTS

| | | |
|---|---|---|
| FR | 2 698 135 B1 | 5/1994 |
| GB | 315 425 A | 9/1930 |
| JP | 8-86395 A | 4/1996 |
| WO | 2007/148364 A2 | 12/2007 |

OTHER PUBLICATIONS

Written Opinion of the International Searching Authority issued in corresponding application PCT/IT2015/000180, dated Jan. 2015.

Search Report issued in corresponding Chinese application 201580039413.3 dated Apr. 13, 2018.

* cited by examiner

SUPPORT DEVICE FOR AQUARIUM ACCESSORIES

This is a National Phase Application in the United States of International Patent Application No. PCT/IT2015/000180 filed Jul. 6, 2015, which claims priority on Italian Patent Application No. VE2014A000044, filed Jul. 22, 2014. The entire disclosures of the above patent applications are hereby incorporated by reference.

The present invention relates to a support device for aquarium accessories such as pumps and aerators.

It is known to use devices for supporting aquarium accessories such as pumps and aerators.

These devices usually comprise a first fixing element able to be applied on the inner surface of a wall of an aquarium and a second fixing element applied on the outer wall of the aquarium facing the first fixing element. Both the first fixing element and the second fixing element comprise suction cups to adhere to the wall of the aquarium and, usually, each of them includes one or more magnets in order to exert a force of mutual attraction thus increasing the strength of adhesion of the two fixing elements to the wall of the aquarium.

By means of a mechanical connection, an accessory for aquarium is applied to the first fixing element, the one which is applied to the inner wall of the aquarium. This connection consists for example of a joint or a ball joint, namely a suitable seat made in the fixing element and a sphere, usually metallic, inserted inside the seat and free to rotate. The sphere is fixed to a rod at the end of which a support is fixed onto which the accessory is mounted.

This makes it possible to orient the accessory in the required direction simply by moving the accessory and have the ball rotates inside its seat.

However, these devices of the prior art have some drawbacks.

In fact, the ball joint is mechanically stressed since it has to support the cantilever weight of an accessory. In addition, to properly orient the accessory, the rod is continuously moved and, then, the joint is subjected to a continuously variable stress. Consequently, by the time, it is not uncommon that the joint may break or stop working properly.

Furthermore, the support device consists of different elements which make it particularly complex. Considering the complexity of the joint and the precision with which it has to be machined, the constructional design and also the assembly of the device is not at all simple.

Therefore, the aim of the present invention is to solve the problems mentioned above with reference to the prior art.

In particular, the aim is to provide a support device for aquarium accessories which is structurally simple and, then, a device composed of few elements which are easily assembled between them.

In addition, the stresses due to the weight of the accessory to be supported, as well as the continual variable stress due to the choice of the correct orientation of the accessory, must be limited and, however, not to cause a breakage or a malfunction.

Such aims are achieved by a supporting device for aquarium accessories according to claim 1.

In this way, as known, thanks to the coupling between the convex cap of the sustaining element and the concave cap of the first fixing element, the embodiment of the device is very simple.

Moreover, due to the solidity of the coupling, the device is reliable and not subjected to breakage or malfunctions.

Finally, due to the magnetic attraction between the first magnetic of ferromagnetic element and the second magnetic or ferromagnetic element, the convex cap of the sustaining element, being interposed between these elements, on one hand is free to rotate with respect to the concave cap of the first fixing element and, on the other hand, is constrained to them thanks to magnetic attraction between the first and the second magnetic or ferromagnetic element.

These and other advantages will become more evident from the following detailed description of an embodiment of the invention provided by illustrative but not limitative purposes with reference to the following drawings wherein.

In FIGS. 1 to 4, a support device for an accessory for aquariums is illustrated as a whole with reference 10.

The device 10 comprises a first fixing element 20, a sustaining element 30 and a first magnetic or ferromagnetic element 40.

The first fixing element 20 is cup-shaped so it comprises a base 22 and a concave cap 28.

Preferably, the base 22 has a circular shape and comprises sucker means 23, preferably composed of a peripheral projecting lip made of an elastically deformable material such as rubber or silicone, able to adhere to the surface of a wall of an aquarium.

The concave cap 28 is also made of an elastically deformable material, such as rubber or silicone.

A recess 24 is made in the base 22 within which a second magnetic or ferromagnetic element 26 is housed.

The sustaining element 30 is hollow and comprises a convex cap 32 and a cylindrical structure 34. The convex cap 32 of the sustaining element 30 has a shape corresponding to that of the concave cap 28 of the first fixing element 20.

The first magnetic or a ferromagnetic element 40 has a cap shape corresponding to that of the concave cap 28 of the first fixing element 20 and that of the convex cap 32 of the sustaining element 30.

The sustaining element 30, being hollow, houses inside it the first magnetic or ferromagnetic cap-shaped element 40, so that the latter rests on the convex cap 32 of the sustaining element 30.

In its turn, the first fixing element 20 houses inside it the sustaining element 30 and, more exactly, the convex cap 32 of the sustaining element 30 rests on the concave cap 28 of the first fixing element 20.

Then, the convex cap 32 of the sustaining element 30 is interposed between the concave cap 28 of the first fixing element 20 and the first magnetic or ferromagnetic cap-shaped element 40.

Thanks to magnetic attraction between the first magnetic or ferromagnetic element 40 and the second magnetic or ferromagnetic element 26, the convex cap 32 and then the sustaining element 30 is supported by the first fixing element 20. In addition, thanks to the coupling resulting from the corresponding shapes of the concave cap 28 of the first fixing element 20 and the convex cap 32 of the sustaining element 30, the sustaining element 30 can be oriented in space in any way by sliding the convex cap 32 inside the concave cap 28.

It can be noted that to ensure a magnetic attraction between the first magnetic or ferromagnetic element 40 and the second magnetic or ferromagnetic 26, there are the following three possibilities:
- the first element 40 is magnetic and the second element 26 is magnetic;
- the first element 40 is magnetic and the second element 26 is ferromagnetic;
- the first element 40 is ferromagnetic and the second element 26 is magnetic.

Figure 1:
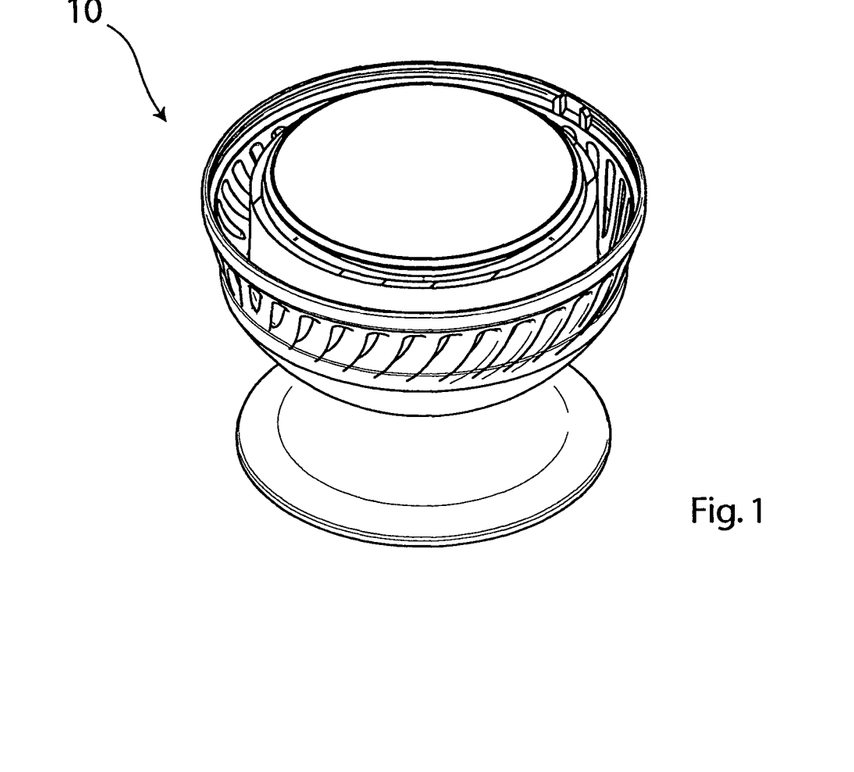
FIG. 1 is a perspective view of a support device for accessories for aquariums according to the invention.
Figure 2:
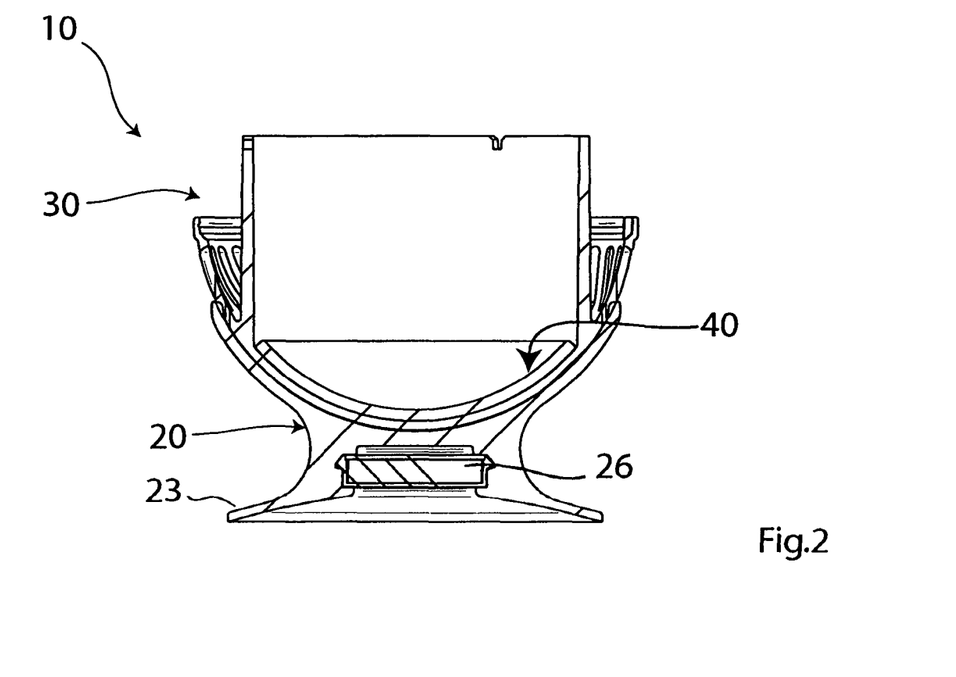
FIG. 2 is a sectional view of the device of FIG. 1.
Figure 3:
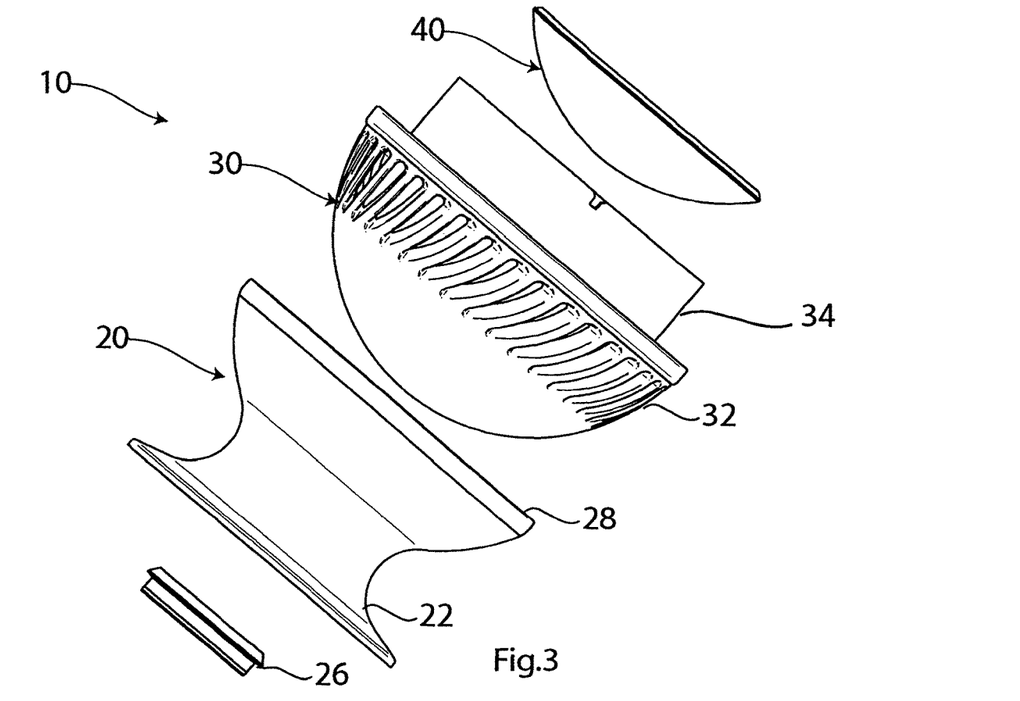
FIG. 3 is an exploded perspective view of the device of FIG. 1.
Figure 4:
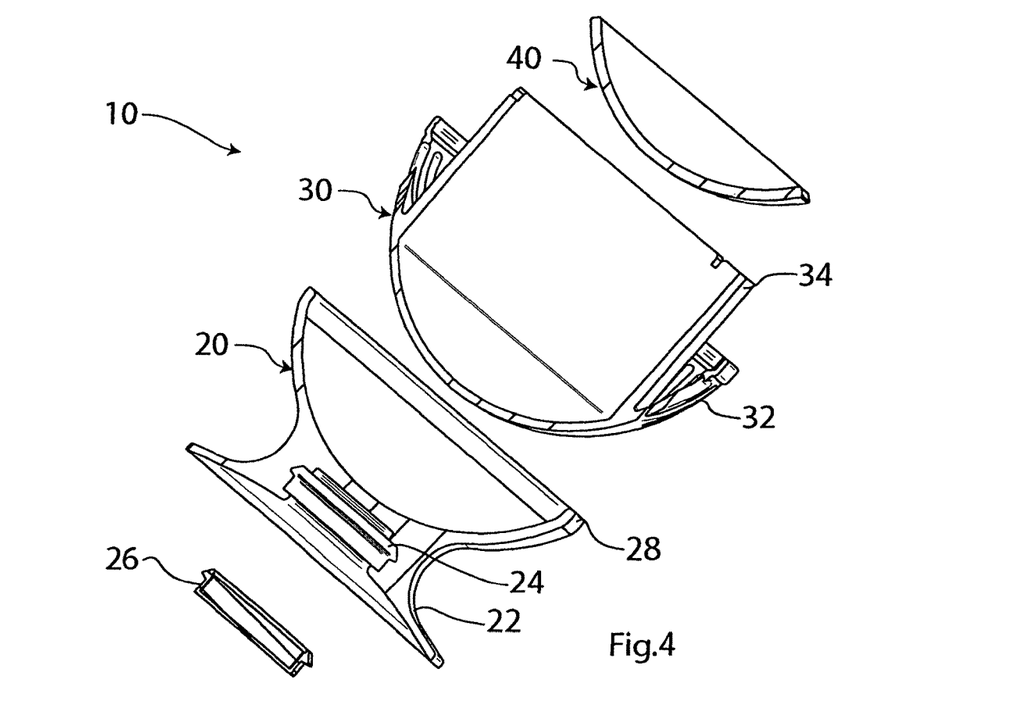
FIG. 4 is a sectional and exploded view of the device of FIG. 1.
Figure 5:
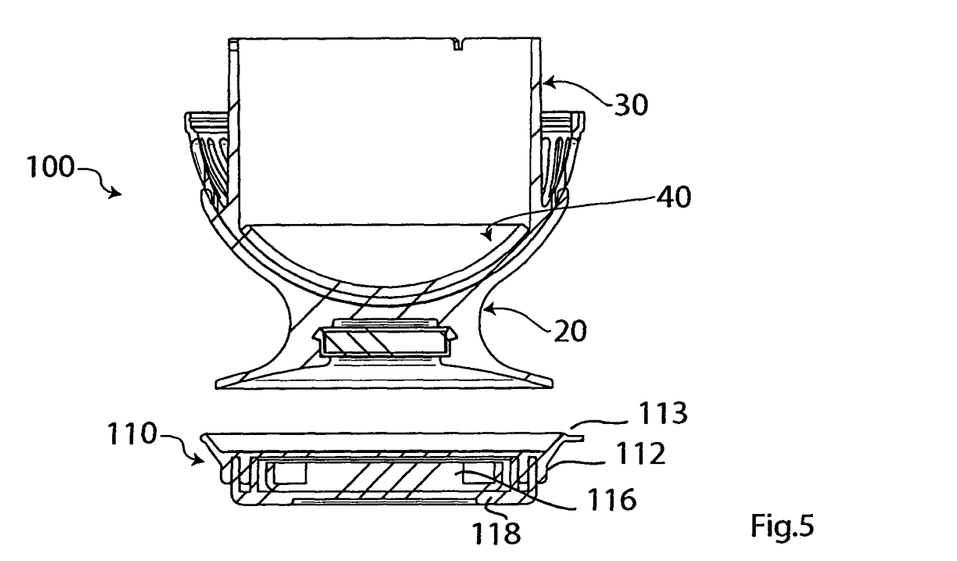
FIG. 5 is a sectional view of a variant of the device of FIG. 1.

In FIG. 5, a support device 100 is shown according to a variant of the invention.

Figure 6:
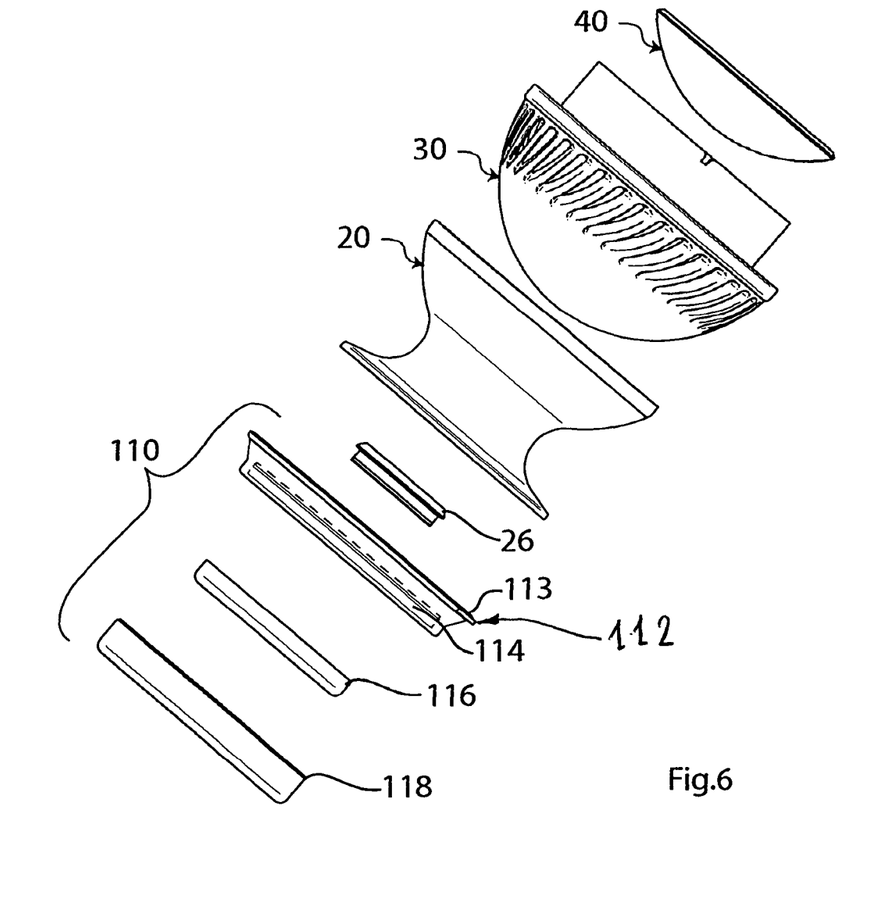
FIG. 6 is an exploded perspective view of the device of FIG. 5.
Figure 7:
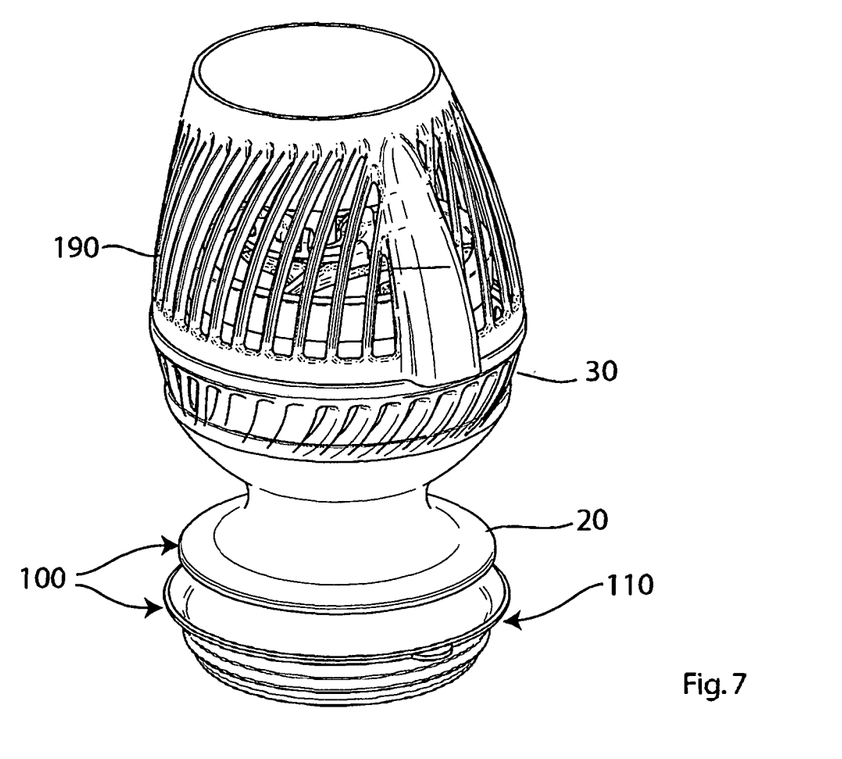
FIG. 7 is a perspective view of the device of FIG. 5 with a pump for aquariums.
Figure 8:
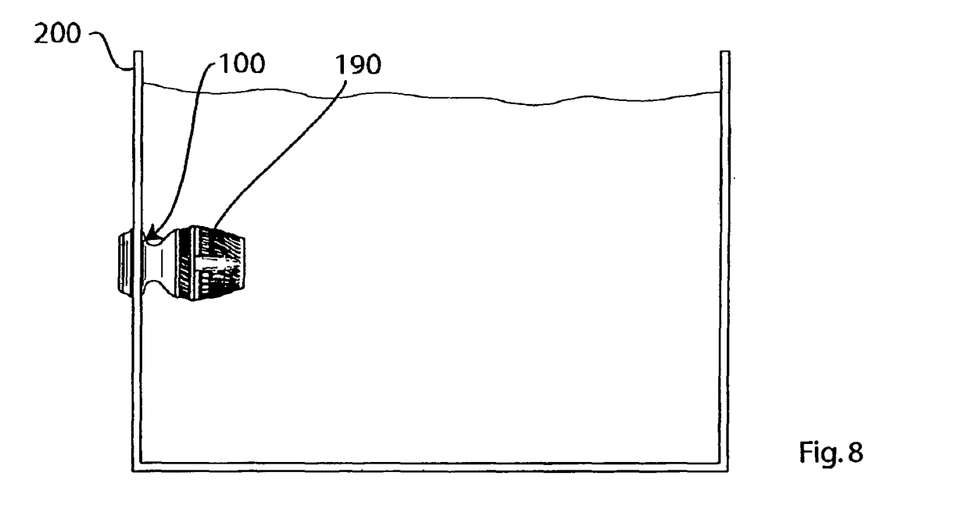
FIG. 8 is a side view of the device with a pump of FIG. 7 applied on the wall of an aquarium.
Figure 9:
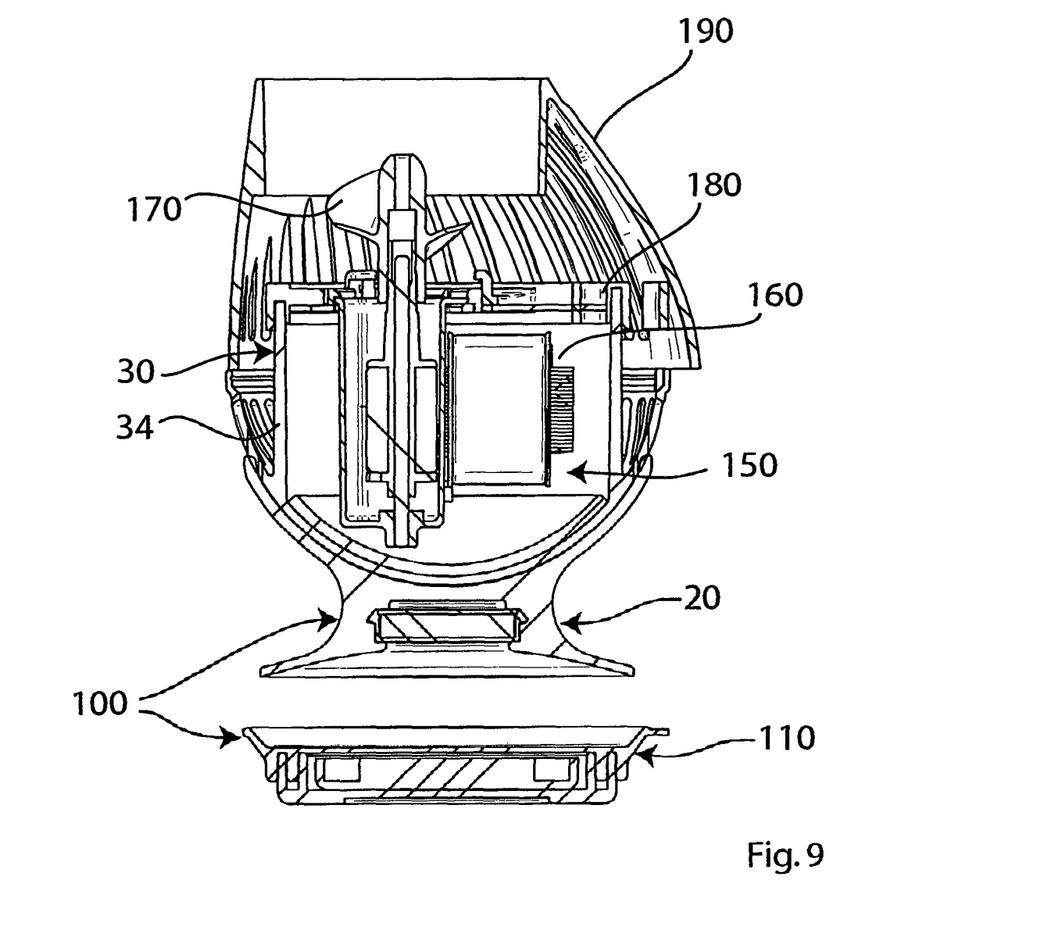
FIG. 9 is a sectional view of the device with a pump of FIG. 7.
Figure 10:
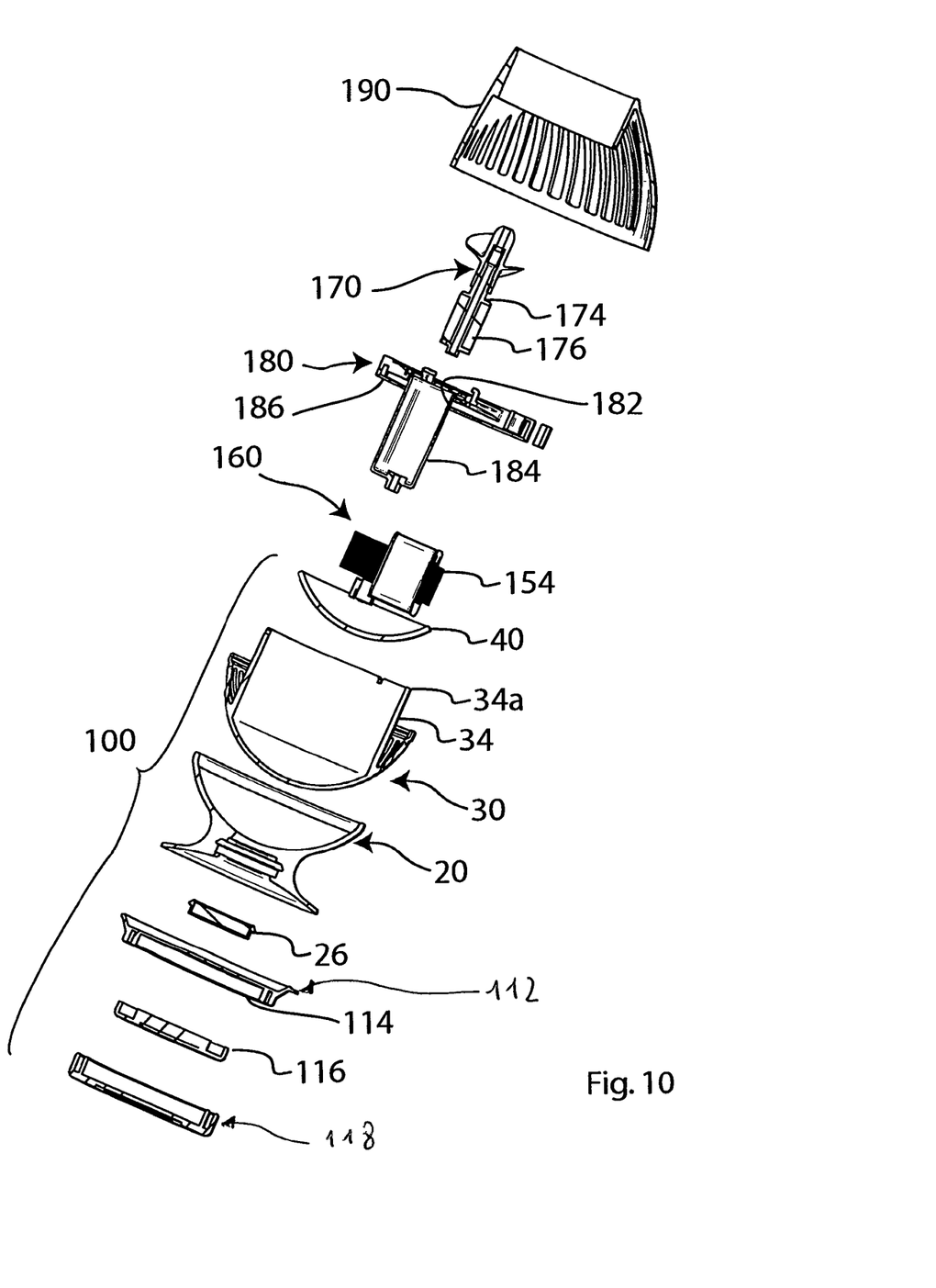
FIG. 10 is a sectional and exploded view of the device with a pump of FIG. 7.

The support device 100 comprises the same elements of the support device 10 which are therefore indicated with the same references, namely a first fixing element 20, a sustaining element 30 and a first magnetic or ferromagnetic element 40.

Moreover, the device 100 comprises a second fixing element 110 to be applied to the outside wall of an aquarium.

The second fixing element 110 comprises a base 112, preferably circular in shape, on which there are suction means 113, preferably composed of a peripheral projecting lip made with elastically deformable material such as rubber or silicone, able to adhere to the wall of an aquarium.

A housing seat 114 is formed in the base 112 wherein a third magnetic or a ferromagnetic element 116 is inserted. The seat 114 is then closed by a lid 118 thus enclosing inside the third magnetic or ferromagnetic element 116.

Thanks to the suction means 113, the second fixing element 110 can be firmly attached to the external wall of an aquarium at the first fixing element 20.

Moreover, thanks to the action exerted between the second magnetic or ferromagnetic element 26 and the third magnetic or ferromagnetic element 116, the first fixing element 20 and the second fixing element 110 are mutually attracted between them and, thus, they are better attached to the wall of the aquarium.

In conclusion, in addition to the sucker means 23 of the first fixing element 20 and the suction means 113 of the second fixing element 110, there is also a magnetic force that attracts the first fixing element 20 and the second fixing element 110, so as the two fixing elements 20, 110 adheres to the wall of the aquarium in a firm manner.

FIGS. 7, 8, 9 and 10 show the support device 100 wherein a pump 150 has been applied.

The first fixing element 20 has been applied on the inner surface of a wall 200 of an aquarium, while the second fixing element 110 has been fixed to the outside of the wall 200 of the aquarium in front of the first fixing element 20.

The pump 150 comprises an electric motor 160 coupled to an impeller 170.

The electric motor 160 comprises a stator 154 and a rotor 176 mounted on a shaft 174 connected to the impeller 170.

There is also a closing disc 180 with a hole 182 around which a tubular element 184 is fixed which is able to house the shaft 174 with the rotor 176.

Near the peripheral edge of the disc 180 there is a circular groove 186 whose dimensions corresponds to the dimension of the upper edge 34a of the cylindrical structure 34 of the sustaining element 30.

Once the electric motor 160 has been positioned inside of the cylindrical structure 34 of the sustaining element 30, the closing disc is applied over the cylindrical structure 34 by inserting the tubular element 184 inside the stator 154 of the electric motor 160, and the space delimited by the cylindrical structure 34 and the closing disc 180 is completely resinated.

In this way, the sustaining element 30, the first magnetic or ferromagnetic element 40 and also the electric motor 160 becomes integral with each other.

Subsequently, the impeller 170 with the rotor 176 is assembled by inserting the rotor 176 inside the tubular element 184.

At the end, a covering element 190 is applied on the sustaining element 30 so that the pump 150 will be enclosed between the sustaining element 30 and the covering element 190.

The covering element 190 is provided with slots to allow water to enter inside sucked by the pump 150 and to exit out pushed by the same pump.

Thanks to:
- the coupling between the convex cap 32 of the sustaining element 30 and the concave cap 28 of the first fixing element 20,
- the attraction between the first magnetic or ferromagnetic element 40 and the second magnetic or ferromagnetic element 26, the sustaining element 30 is, at the same time, linked to the first fixing element 20, but it is also free to rotate, so as to orient the pump 150 in the best direction.

The first fixing element 20 is preferably made of a transparent material so to easily realize if the sucker means 23 have adhered perfectly to the inner surface of the wall 200 of the aquarium and if the convex cap 32 of the sustaining element 30 adapts to the concave cap 28 in a perfect way.

Similarly, the second fixing element 110 is also preferably made of a transparent material so to be easily realize if the suction means 113 have adhered perfectly to the outside surface of the wall 200 of the aquarium.

Preferably, also the sustaining element 30 and the covering element 190 are made of a transparent material so to easily realize if the pump inside them has been positioned correctly.

The transparent materials of the various components of the support device 10 and 100 are for example polymeric substances, such as acrylic resins (in particular polymethyl methacrylate known by the name Plexiglas®) or silicone materials.

Furthermore, the device 100 is very simple both to realize and to assemble and disassemble in order to perform maintenance or cleaning operations.

Moreover, thanks to its simplicity, it is very reliable.

It is clear that any modification or variation conceptually or functionally equivalent falls within the scope of the present invention.

For example, the first fixing element, the sustaining element and the second fixing element may have a different number of magnetic elements or ferromagnetic elements.

Furthermore, the first and the second fixing elements may have a base with a different shape than the circular shape, for example an oval or square shape.

The concave cap 28 of the first fixing element 20, the convex cap 32 of the sustaining element 30 and the first magnetic or ferromagnetic element 40 are preferably spherical in shape, but may have similar but different shapes, such as a paraboloid, ellipsoid or hyperboloid shapes.

The invention claimed is:

1. A support device for accessories for aquariums comprising:
   (1) a first magnetic or ferromagnetic element having a cap portion;
   (2) a cup-shaped first fixing element appliable on the inner surface of a wall of an aquarium and comprising a concave cap portion and a second magnetic or ferromagnetic element; and
   (3) a hollow sustaining element for an aquarium accessory supportable by the first fixing element and having a convex cap portion rotationally and moveably housable at least partially inside the concave cap portion of the first fixing element, to form a ball joint between the concave cap portion of the first fixing element and the convex cap portion of the hollow sustaining element, the first magnetic or ferromagnetic element having a shape corresponding to the concave cap portion of the first fixing element and the convex cap portion of the hollow sustaining element,
   wherein the first magnetic or ferromagnetic element is housed in the hollow sustaining element so that the cap portion rests on the convex cap portion of the sustaining element,
   wherein the hollow sustaining element is housed inside the first fixing element so that the convex cap of the sustaining element rests on the concave cap of the first fixing element, in such a way that the convex cap of the sustaining element is interposed between the concave cap of the first fixing element and the first magnetic or ferromagnetic element so that thereby, due to magnetic attraction between the first magnetic or ferromagnetic element and the second magnetic or ferromagnetic element, the hollow sustaining element is supported by the first fixing element and, the hollow sustaining element is rotationally movable.

2. The support device according to claim 1, wherein the sustaining element and the first magnetic or ferromagnetic element are rigidly coupled together.

3. The support device according to claim 2, wherein the first fixing element comprises a suction cup or lip appliable and adherable to the inner surface of the wall of the aquarium.

4. The support device according to claim 1, wherein the concave cap of the first fixing element comprises an elastically deformable material.

5. The support device according to claim 4, wherein the first fixing element comprises a suction cup appliable and adherable to the inner surface of the wall of the aquarium.

6. The support device according to claim 1, wherein the first fixing element comprises a suction cup or lip appliable and adhereable to the inner surface of the wall of the aquarium.

7. The support device according claim 1, wherein the support device further comprises
   (4) a second fixing element appliable to an outside of the wall of the aquarium, the second fixing element comprising a third magnetic or ferromagnetic element,
   wherein the third magnetic or ferromagnetic element, due to the magnetic interaction with the second magnetic or ferromagnetic element, allows the first fixing element and the second fixing element to attract each other, and then to adhere to the wall of the aquarium.

8. The support device according to claim 7, wherein the second fixing element further comprises a suction cup or lip appliable and adhereable to the outer surface of the wall of the aquarium.

9. The support device according to claim 8, wherein the first magnetic or ferromagnetic element is a ferromagnetic element, the second magnetic or ferromagnetic element is a magnetic element, and the third magnetic or ferromagnetic element is a magnetic element.

10. The support device according to claim 7, wherein the first magnetic or ferromagnetic element is a ferromagnetic element, the second magnetic or ferromagnetic element is a magnetic element, and the third magnetic or ferromagnetic element is a magnetic element.

11. The support device according to claim 1, wherein one of the group consisting of (a) the first fixing element, (b) the second fixing element, (c) the sustaining element, (d) the first fixing element and the second fixing element, (e) the first fixing element and the sustaining element, (f) the second fixing element and the sustaining element, and (g) the first fixing element, the second fixing element, and the sustaining element, is made of a transparent material.

12. The support device according to claim 1, wherein the support device is coupled to an accessory for aquariums.

13. The support device according to claim 12, wherein the accessory for aquariums is a pump or aerator.

14. The support device according to claim 13, wherein the support device is coupled to a covering element mounted on the sustaining element, so that the pump or aerator is housed inside the sustaining element and the covering element.

15. The support device according to claim 12, wherein the accessory for aquariums is an aerator.

16. The support device according to claim 1, further comprising a cylindrical structure, disposed on a rear, concave portion of the convex cap portion of the hollow sustaining element.

* * * * *